United States Patent
Togashi

(10) Patent No.: US 7,859,820 B2
(45) Date of Patent: Dec. 28, 2010

(54) MULTILAYER CAPACITOR WITH CAPACITOR ELEMENT BODY HAVING LAMINATED INSULATOR LAYERS

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 297 days.

(21) Appl. No.: 12/136,474

(22) Filed: Jun. 10, 2008

(65) Prior Publication Data

US 2009/0015985 A1 Jan. 15, 2009

(30) Foreign Application Priority Data

Jul. 9, 2007 (JP) .............................. 2007-179954

(51) Int. Cl.
*H01G 4/00* (2006.01)
*H01G 4/005* (2006.01)
*H01G 2/20* (2006.01)

(52) U.S. Cl. .................. 361/306.3; 361/303; 361/308.1

(58) Field of Classification Search .............. 361/306.3, 361/306.1, 306.2, 303, 308.1, 309, 321.2, 361/304, 311, 301.4, 305, 321.3

See application file for complete search history.

(56) References Cited

U.S. PATENT DOCUMENTS

| | | | | |
|---|---|---|---|---|
| 6,765,781 | B2 * | 7/2004 | Togashi | 361/306.3 |
| 7,088,569 | B1 * | 8/2006 | Togashi et al. | 361/303 |
| 7,145,429 | B1 * | 12/2006 | Togashi et al. | 336/200 |
| 2005/0047059 | A1 * | 3/2005 | Togashi | 361/306.3 |
| 2007/0047176 | A1 * | 3/2007 | Togashi | 361/305 |
| 2008/0186650 | A1 * | 8/2008 | Beker et al. | 361/306.2 |
| 2008/0291600 | A1 * | 11/2008 | Takashima et al. | 361/306.1 |

FOREIGN PATENT DOCUMENTS

| | | |
|---|---|---|
| JP | A-2004-140183 | 5/2004 |
| JP | A-2005-079237 | 3/2005 |
| JP | A-2006-196685 | 7/2006 |

OTHER PUBLICATIONS

Japanese Office Action issued in Japanese Patent Application No. 2007-179954 on Jun. 16, 2009.

* cited by examiner

*Primary Examiner*—Eric Thomas
*Assistant Examiner*—David M Sinclair
(74) *Attorney, Agent, or Firm*—Oliff & Berridge, PLC

(57) ABSTRACT

A multilayer capacitor has a capacitor element body, first and second terminal electrodes, and a connection conductor. The capacitor element body has a plurality of insulator layers laminated, and a plurality of first and second internal electrodes arranged with at least one of the insulator layers in between. The first and second terminal electrodes are disposed on one external surface extending parallel to a laminating direction of the insulator layers. The connection conductor is disposed on an exterior surface extending parallel to the laminating direction of the insulator layers. The first internal electrodes include two types of internal electrodes, a type of internal electrode connected to the first terminal electrode and the connection conductor and a type of internal electrode connected to the connection conductor only. The second internal electrodes are connected to the second terminal electrode.

8 Claims, 5 Drawing Sheets (a)

(b)

(c)

MULTILAYER CAPACITOR WITH CAPACITOR ELEMENT BODY HAVING LAMINATED INSULATOR LAYERS

BACKGROUND OF THE INVENTION

1. Field of the Invention

The present invention relates to a multilayer capacitor.

2. Related Background Art

A known multilayer capacitor is one having a capacitor element body having a plurality of insulator layers laminated, and a plurality of first internal electrodes and second internal electrodes arranged as opposed with at least one of the insulator layers in between, and first and second terminal electrodes disposed on an external surface extending in a direction parallel to a laminating direction of the insulator layers, among external surfaces of the capacitor element body, wherein the plurality of first internal electrodes are connected to the first terminal electrode and wherein the plurality of second internal electrodes are connected to the second terminal electrode (e.g., cf. Japanese Patent Application Laid-open No. 2004-140183). In the ceramic electronic component described in Japanese Patent Application Laid-open No. 2004-140183 (Patent Document 1), the first and second terminal electrodes are disposed on the same external surface, and current pathways established in the multilayer capacitor are thus relatively short, so that the equivalent series inductance (ESL) can be reduced.

SUMMARY OF THE INVENTION

Incidentally, with the multilayer capacitor, there is a further demand for control of equivalent series resistance (ESR) to a desired value according to its application. For example, where the multilayer capacitor is used as a decoupling capacitor, there is a need as described below. As for a power supply for supplying power to a central processing unit (CPU) mounted on digital electronic equipment, the voltage is becoming lower on one hand and a load current is becoming larger on the other hand. Therefore, it became very difficult to keep variation in the power-supply voltage within a tolerance against rapid change of the load current and for this reason, the multilayer capacitor called the decoupling capacitor has been connected to the power supply. An electric current is supplied from this multilayer capacitor to the CPU upon transient variation of the load current so as to suppress variation of the power-supply voltage. The load current is recently becoming fast and larger with further increase in operating frequency of the CPU, and the multilayer capacitor used as the decoupling capacitor is thus required to have a larger capacity and larger equivalent series resistance.

With the multilayer capacitor described in Patent Document 1, however, nothing was contemplated for control of the equivalent series resistance to a desired value.

An object of the present invention is to provide a multilayer capacitor permitting easy and accurate control of the equivalent series resistance, while keeping the equivalent series inductance low.

Means for Accomplishing the Object

A multilayer capacitor according to the present invention is a multilayer capacitor comprising: a capacitor element body having a plurality of insulator layers laminated, and a plurality of first internal electrodes and second internal electrodes arranged as opposed with at least one of the insulator layers in between; first and second terminal electrodes disposed on one external surface extending in a direction parallel to a laminating direction of the insulator layers, among external surfaces of the capacitor element body; and a connection conductor disposed on an external surface extending in the direction parallel to the laminating direction of the insulator layers, among the external surfaces of the capacitor element body; wherein the plurality of first internal electrodes include two types of internal electrodes, a type of internal electrode connected to the first terminal electrode and the connection conductor, and a type of internal electrode connected to the connection conductor only; and wherein the plurality of second internal electrodes are connected to the second terminal electrode.

In the multilayer capacitor according to the present invention, the plurality of first internal electrodes include the two types of internal electrodes, the type of internal electrode connected to the first terminal electrode and the connection conductor and the type of internal electrode connected to the connection conductor only. In this configuration, the type of internal electrode connected to the connection conductor only, is electrically connected through the connection conductor to the type of internal electrode connected to the first terminal electrode and the connection conductor.

Incidentally, in the multilayer capacitor described in the foregoing Laid-open No. 2004-140183, all the internal electrodes are connected to the corresponding terminal electrodes and all the internal electrodes are connected in parallel to the terminal electrodes. Since resistance components made by the respective internal electrodes are connected in parallel to the terminal electrodes, the equivalent series resistance becomes extremely small. The equivalent series resistance will become much smaller if the number of insulator layers and internal electrodes laminated is increased in order to set the capacitance of the multilayer capacitor at a large value.

The inventors conducted elaborate research on the multilayer capacitor for readily and accurately controlling the equivalent series resistance. As a result, the inventors came to find the new fact that the combined resistance of the internal electrodes can be changed and the equivalent series resistance of the multilayer capacitor can be set at a desired value by connecting the internal electrodes with a connection conductor disposed on an external surface of the capacitor element body and by changing the number of internal electrodes connected to the terminal electrode. Namely, when the multilayer capacitor is formed in the structure wherein the number of internal electrodes connected in parallel to the terminal electrode is decreased by the number of internal electrodes connected to the connection conductor only and wherein the combined resistance component by the internal electrodes connected to the connection conductor only is connected in series to the terminal electrode, the combined resistance of the internal electrodes becomes larger and the equivalent series resistance of the multilayer capacitor becomes larger than those in the structure wherein all the internal electrodes are connected to the terminal electrode. When the multilayer capacitor is constructed in the structure wherein the number of internal electrodes connected directly to the terminal electrode is set smaller than the total number of internal electrodes, i.e., when the multilayer capacitor has the internal electrodes connected indirectly to the terminal electrode through the connection conductor as described above, it becomes feasible to implement adjustment in the direction to increase the equivalent series resistance.

Based on the above, the present invention enables easy and accurate control of the equivalent series resistance of the multilayer capacitor.

Another multilayer capacitor according to the present invention is a multilayer capacitor comprising: a capacitor element body having a plurality of insulator layers laminated, and a plurality of first internal electrodes and second internal electrodes arranged as opposed with at least one of the insulator layers in between; first and second terminal electrodes disposed on one external surface extending in a direction parallel to a laminating direction of the insulator layers, among external surfaces of the capacitor element body; and a connection conductor disposed on an external surface extending in the direction parallel to the laminating direction of the insulator layers, among the external surfaces of the capacitor element body; wherein the plurality of first internal electrodes are connected to the connection conductor; wherein the plurality of second internal electrodes are connected to the second terminal electrode; and wherein the first internal electrodes as many as at least one and at most a number smaller by one than a total number of the first internal electrodes, among the plurality of first internal electrodes are connected to the first terminal electrode.

In the multilayer capacitor according to the present invention, the first internal electrodes as many as at least one and at most the number smaller by one than the total number of first internal electrodes, among the plurality of first internal electrodes are connected to the first terminal electrode, whereby the first internal electrodes not connected to the first terminal electrode are electrically connected through the internal electrodes connected to the connection conductor and the first terminal electrode, to the first terminal electrode. The first internal electrodes not connected to the first terminal electrode are electrically connected through the connection conductor to the internal electrodes connected to the first terminal electrode. Therefore, the present invention enables easy and accurate control of the equivalent series resistance of the multilayer capacitor, as described above.

In either of the above aspects of the present invention, the first and second terminal electrodes are disposed on the one external surface. This makes relatively short current pathways established in the multilayer capacitor, so that the equivalent series inductance of the multilayer capacitor can be reduced.

Preferably, the external surface on which the first and second terminal electrodes are disposed is different from the external surface on which the connection conductor is disposed. In this case, it is feasible to prevent the first and second terminal electrodes and the connection conductor from short-circuiting.

More preferably, the external surface on which the first and second terminal electrodes are disposed faces the external surface on which the connection conductor is disposed. In this case, it is feasible to more reliably prevent the first and second terminal electrodes and the connection conductor from short-circuiting.

Preferably, the external surface on which the first and second terminal electrodes are disposed constitutes a mounted surface to be opposed to another component.

The present invention successfully provides the multilayer capacitor permitting easy and accurate control of the equivalent series resistance, while keeping the equivalent series inductance low.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description the same elements or elements with the same functionality will be denoted by the same reference symbols, without redundant description.

Figure 1:
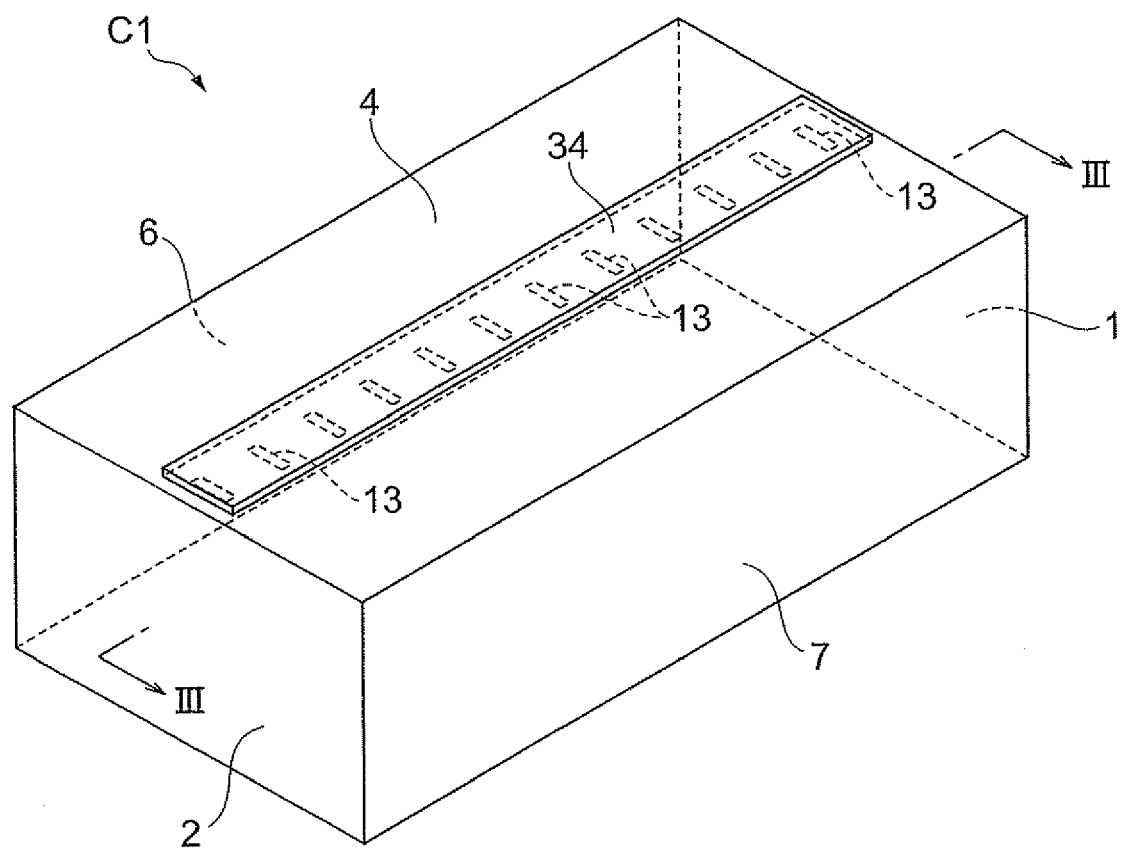
FIG. 1 is a schematic perspective view showing a multilayer capacitor according to an embodiment of the present invention.
Figure 2:
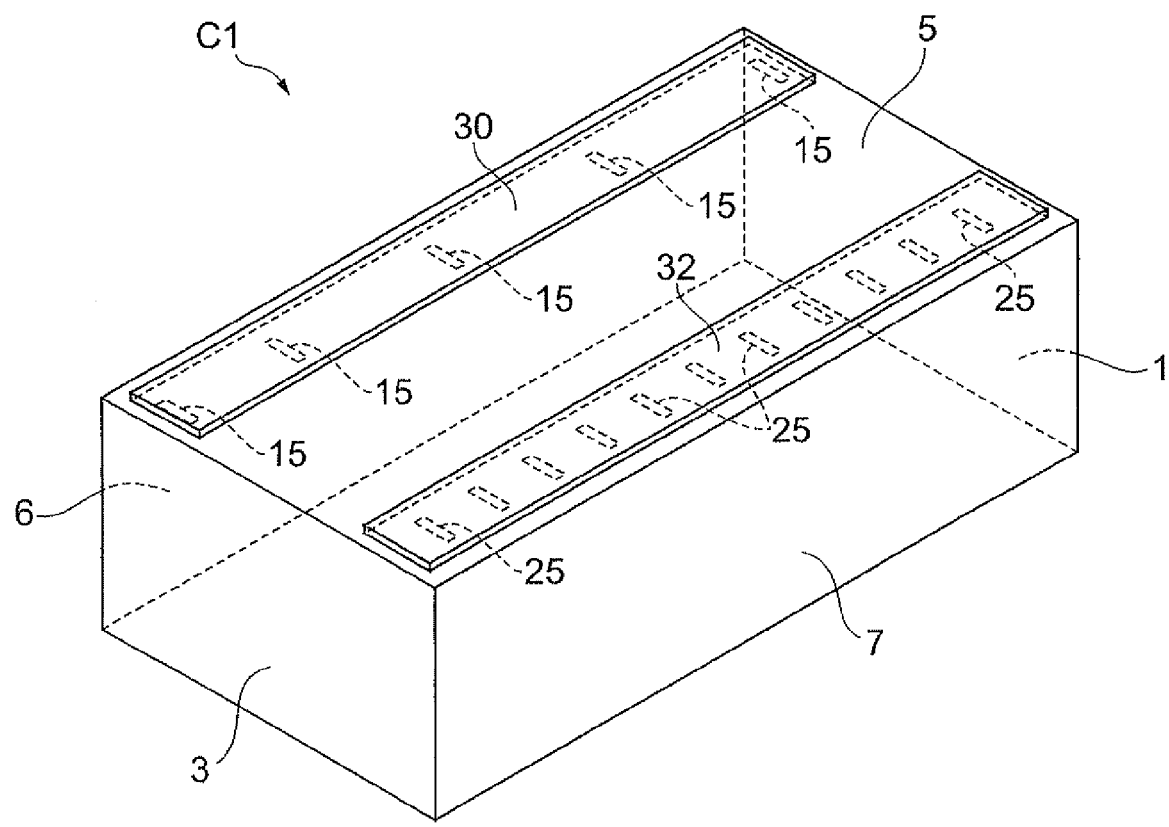
FIG. 2 is a schematic perspective view showing the multilayer capacitor of the embodiment.
Figure 3:
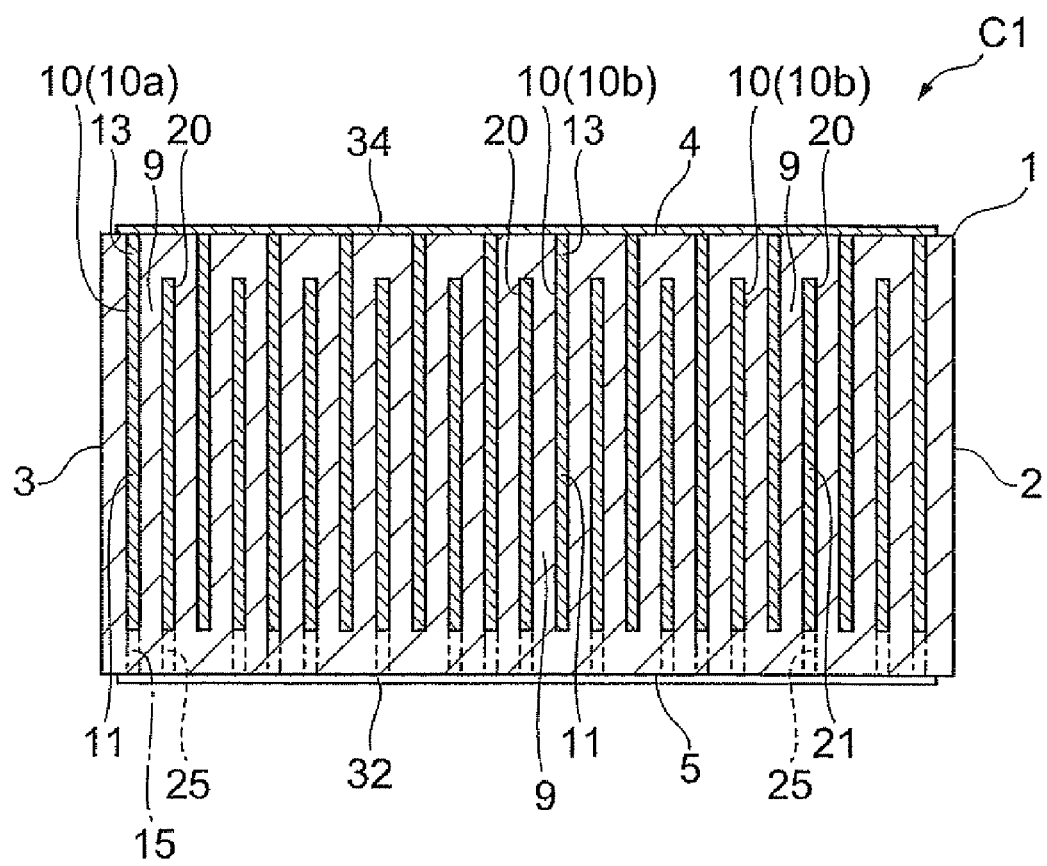
FIG. 3 is a drawing showing a sectional configuration along line III-III in FIG. 1.
Figure 4:
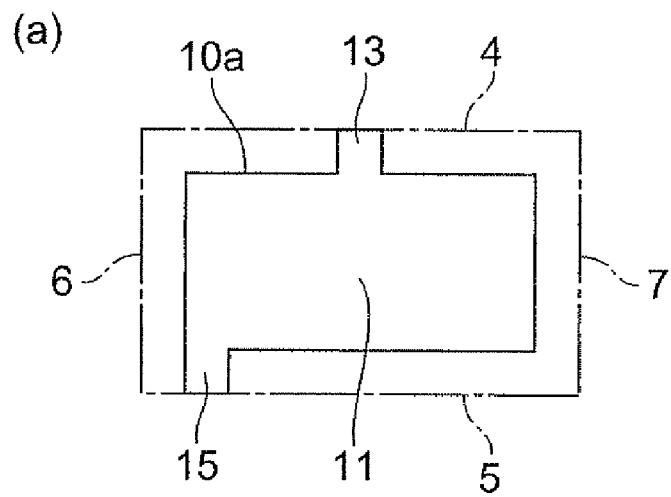
FIG. 4 is a drawing showing configurations of internal electrodes.
Figure 4:
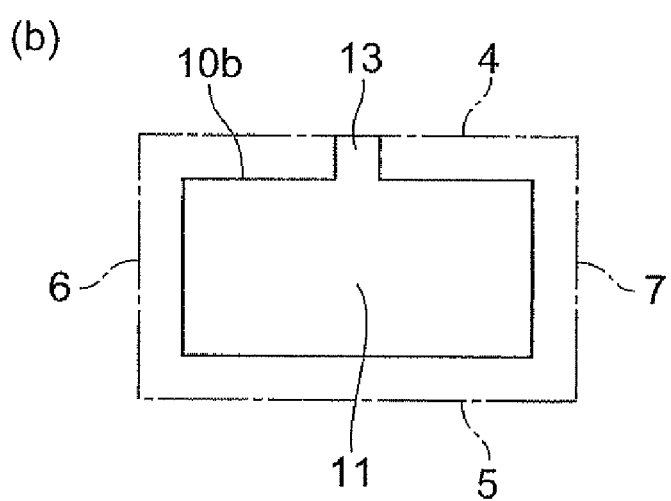
Figure 4:
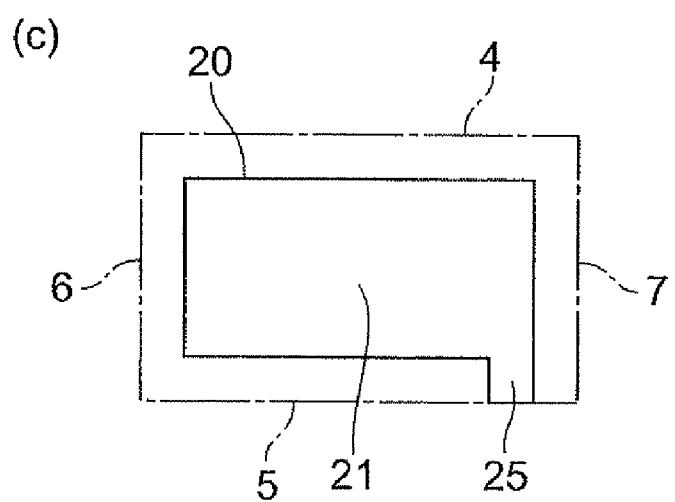

A configuration of a multilayer capacitor C1 according to an embodiment of the present invention will be described with reference to FIGS. 1 to 4. FIG. 1 is a schematic perspective view showing the multilayer capacitor according to the present embodiment. FIG. 2 is a schematic perspective view showing the multilayer capacitor according to the present embodiment. FIG. 3 is a drawing showing a sectional configuration along line III-III in FIG. 1. In FIG. 4 each of (a)-(c) is a view showing a configuration of an internal electrode.

The multilayer capacitor C1, as shown in FIGS. 1 and 2, is provided with a capacitor element body 1 of a nearly rectangular parallelepiped shape, a first terminal electrode 30, a second terminal electrode 32, and a connection conductor 34.

The capacitor element body 1 includes a first end face 2 and a second end face 3 facing each other, a first side face 4 and a second side face 5 facing each other, and a third side face 6 and a fourth side face 7 facing each other. The first side face 4 and the second side face 5 extend in a first direction in which the first and second end faces 2, 3 face each other, so as to connect the first and second end faces 2, 3. The third side face 6 and the fourth side face 7 extend in the first direction in which the first and second end faces 2, 3 face each other, so as to connect the first and second end faces 2, 3. The first direction, a second direction in which the first and second side faces 4, 5 face each other, and a third direction in which the third and fourth side faces 6, 7 face each other, are orthogonal to each other. In the present embodiment, the second side face 5 is a mounted surface to be opposed to another component (e.g., a circuit board, an electronic component, or the like).

The capacitor element body 1, as shown in FIG. 3, has a plurality of insulator layers 9, and a plurality of first internal electrodes 10 (twelve layers in the present embodiment) and second internal electrodes 20 (eleven layers in the present embodiment). The capacitor element body 1 is composed of a laminate in which the insulator layers 9 are laminated in the first direction in which the first and second end faces 2, 3 face each other, and has the dielectric property. Each insulator layer 9 is composed, for example, of a sintered body of a ceramic green sheet containing a dielectric ceramic (a dielectric ceramic such as a $BaTiO_3$ type ceramic, a $Ba(Ti, Zr)O_3$ type ceramic, or a $(Ba, Ca)TiO_3$ type ceramic). The insulator layers 9 are integrally formed in the practical multilayer capacitor C1 so that no border can be visually recognized between them.

The first internal electrodes 10 and the second internal electrodes 20 are alternately arranged in the capacitor element body 1 so that they are opposed in the first direction with at least one insulator layer 9 being a portion of the capacitor element body 1, in between. The first and second internal electrodes 10, 20 are made of an electrically conductive material (e.g., a base metal Ni or the like) usually used as internal electrodes in a multilayer electric element. Each of the first and second internal electrodes 10, 20 is constructed as a sintered body of an electroconductive paste containing the aforementioned electrically conductive material.

Each first internal electrode 10, as shown in FIGS. 4 (a) and (b), has a main electrode portion 11 of a rectangular shape the longitudinal direction of which is the third direction in which the third and fourth side faces 6, 7 face each other. The plurality of first internal electrodes 10 include two types of internal electrodes 10a, 10b. In the present embodiment the plurality of first internal electrodes 10 include five layers of first internal electrodes 10a, and seven layers of first internal electrodes 10b.

One type of first internal electrode 10a, as shown in FIG. 4 (a), further has a first lead portion 13 extending from the main electrode portion 11 so that an end thereof is exposed in the first side face 4, and a second lead portion 15 extending from the main electrode portion 11 so that an end thereof is exposed in the second side face 5. The other type of first internal electrode 10b, as shown in FIG. 4 (b), further has only a first lead portion 13, without the second lead portion 15. Namely, the plurality of first internal electrodes 10 include the first internal electrodes 10a having the main electrode portion 11, the first lead portion 13, and the second lead portion 15, and the first internal electrodes 10b having the main electrode portion 11 and the first lead portion 13.

The first lead portion 13 extends from the vicinity of the center of the longer side of the main electrode portion 11 on the first side face 4 side to the first side face 4. The second lead portion 15 extends from the end of the longer side of the main electrode portion 11 on the second side face 5 side and on the third side face 6 side, to the second side face 5.

Each second internal electrode 20, as shown in FIG. 4 (c), has a main electrode portion 21 of a rectangular shape the longitudinal direction of which is the third direction in which the third and fourth side faces 6, 7 face each other, and a third lead portion 25 extending from the main electrode portion 21 so that an end thereof is exposed in the second side face 5. The third lead portion 25 extends from the end of the longer side of the main electrode portion 21 on the second side face 5 side and on the fourth side face 7 side, to the second side face 5.

The main electrode portion 11 of a first internal electrode 10 and the main electrode portion 21 of a second internal electrode 20 are opposed to each other with an insulator layer 9 in between. An overlap of the insulator layer 9 with the main electrode portion 11 of the first internal electrode 10 and the main electrode portion 21 of the second internal electrode 20 is a region that substantially produces a capacitance of the multilayer capacitor C1.

Figure 5:
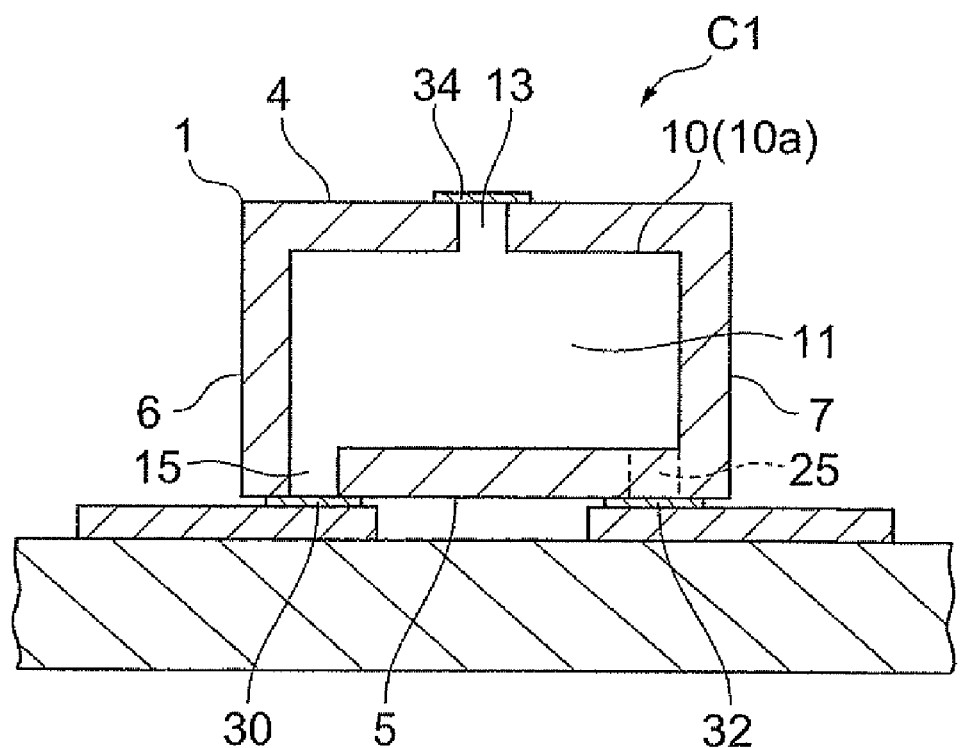
FIG. 5 is a drawing showing a state in which the multilayer capacitor of the embodiment is mounted on another component.

The first and second end faces 2, 3 face each other in the opposed direction of the first internal electrodes 10 and the second internal electrodes 20. Therefore, in a state in which the multilayer capacitor C1 is mounted on another component, as shown in FIG. 5, the first internal electrodes 10 and the second internal electrodes 20 extend in a direction perpendicular to a mount surface of the other component (surface on which the multilayer capacitor C1 is mounted).

The first terminal electrode 30 is disposed on the second side face 5 of the capacitor element body 1. The first terminal electrode 30 is formed as extending in the first direction so as to cover all the exposed parts of the second lead portions 15 in the second side face 5. The first terminal electrode 30 is physically and electrically connected to each second lead portion 15. This makes all the first internal electrodes 10a electrically and physically connected to the first terminal electrode 30.

The second terminal electrode 32 is disposed on the second side face 5 of the capacitor element body 1. The second terminal electrode 32 is formed as extending in the first direction so as to cover all the exposed parts of the third lead portions 25 in the second side face 5. The second terminal electrode 32 is physically and electrically connected to each third lead portion 25. This makes all the second internal electrodes 20 electrically and physically connected to the second terminal electrode 32.

The connection conductor 34 is disposed on the first side face 4 of the capacitor element body 1. The connection conductor 34 is formed as extending in the first direction so as to cover all the exposed parts of the first lead portions 13 in the first side face 4. The connection conductor 34 is physically and electrically connected to each first lead portion 13. This makes all the first internal electrodes 10 (10a and 10b) electrically and physically connected to the connection conductor 34. The first internal electrodes 10b are electrically connected through the connection conductor 34 and the first internal electrodes 10a to the first terminal electrode 30.

The first and second terminal electrodes 30, 32 and the connection conductor 34 are formed, for example, by applying an electroconductive paste containing an electroconductive metal powder and glass frit, onto the exterior of the capacitor element body 1 and baking it. A plated layer is sometimes formed on the first and second terminal electrodes 30, 32 and the connection conductor 34 after baked, according to need. The application of the electroconductive paste can be implemented by dipping, printing, or the like. The first and second terminal electrodes 30, 32 and the connection conductor 34 are formed as electrically isolated from each other on the surface of the capacitor element body 1.

In the present embodiment, all the first internal electrodes 10 are not connected directly to the first terminal electrode 30, but only the first internal electrodes 10a are connected directly to the first terminal electrode 30 and the first internal electrodes 10b are connected indirectly to the first terminal electrode 30 through the connection conductor 34 and the first internal electrodes 10a, as described above. Namely, the multilayer capacitor C1 has the structure wherein the plurality of first internal electrodes 10 are connected to each other through the connection conductor 34 and wherein the first internal electrodes 10 (five layers of first internal electrodes 10a in the present embodiment) as many as at least one and at most a number smaller by one than the total number of the first internal electrodes 10 (twelve layers in the present embodiment), among the plurality of first internal electrodes 10 are connected to the first terminal electrode 30.

If all the first internal electrodes 10 are connected directly to the first terminal electrode 30, all the first internal electrodes 10 will be connected in parallel to the first terminal electrode 30. In contrast to it, the present embodiment involves the structure wherein the first internal electrodes 10b are connected indirectly to the first terminal electrode 30, whereby the number of internal electrodes connected in parallel to the first terminal electrode 30 is smaller by the number of first internal electrodes 10b. In the present embodiment the combined resistance component by the first internal electrodes 10b is connected in parallel to the first terminal electrode 30.

Furthermore, when attention is focused on the first terminal electrode 30 in the multilayer capacitor C1, the resistance component of the connection conductor 34 is connected in series to the first terminal electrode 30.

For these reasons, the multilayer capacitor C1 has the larger combined resistance component by the first internal electrodes 10 than the multilayer capacitor of the configuration in which all the first internal electrodes 10 are connected to the first terminal electrode 30.

In the multilayer capacitor C1, the combined resistance component by the first internal electrodes 10 is varied when the number of first internal electrodes 10a connected directly to the first terminal electrode 30 is changed within the range of at least one and at most the number smaller by one than the total number of the first internal electrodes 10.

In the present embodiment, as described above, the equivalent series resistance of the multilayer capacitor C1 is set at a desired value by adjusting the number of first internal electrodes 10a connected directly to the first terminal electrode 30. It is thus feasible to implement easy and accurate control of the equivalent series resistance of the multilayer capacitor C1.

The present embodiment is able to prevent the equivalent series resistance of the multilayer capacitor C1 from becoming smaller even in cases where the capacitance is increased by increasing the number of laminated first internal electrodes 10 and second internal electrodes 20 in order to adapt for increase in capacitance.

Since in the present embodiment the first and second terminal electrodes 30, 32 are disposed on the second side face 5 of the capacitor element body 1, current pathways established in the multilayer capacitor C1 are relatively short. This enables reduction in the equivalent series inductance of the multilayer capacitor C1.

In the present embodiment, the second side face 5 with the first and second terminal electrodes 30, 32 thereon faces the first side face 4 with the connection conductor 34 thereon. This configuration is able to more reliably prevent the first and second terminal electrodes 30, 32 and the connection conductor 34 from short-circuiting.

The above described the preferred embodiment of the present invention, but it is noted that the present invention is not always limited to the above-described embodiment but can be modified in many ways without departing from the scope of the invention.

The number of first internal electrodes 10a connected to the first terminal electrode 30 is not limited to the number described in the above-described embodiment. For example, the number of first internal electrodes 10a connected to the first terminal electrode 30 may be six or more (provided that it is not more than the number smaller by one than the total number of first internal electrodes 10), or may be four or less (provided that it is not less than 1). The positions of the first internal electrodes 10a and the first internal electrodes 10b in the laminating direction of the insulator layers 9 are not limited to those described in the above embodiment, either.

The number of insulator layers 9 laminated is not limited to that described in the above embodiment. The number of insulator layer 9 between the first internal electrodes 10 and the second internal electrodes 20 may be at least one, and may be, for example, two or more.

The connection conductor 34 may be formed across two side faces adjacent to each other (e.g., across the first and third side faces 4, 6 or across the first and fourth side faces 4, 7). The number of connection conductor 34 is not limited to that described in the above embodiment, but may be, for example, two or more.

The external surface on which the connection conductor 34 is disposed does not have to be limited to the first side face 4, but may be any one of the second to fourth side faces 5, 6, 7. However, in order to prevent it from short-circuiting with the first and second terminal electrodes 30, 32, it is preferable that the connection conductor 34 be disposed on a side face different from the second side face 5 on which the first and second terminal electrodes 30, 32 are disposed. In a case where a plurality of connection conductors 34 are provided, they may be disposed on the same side face or may be disposed on different side faces.

The first terminal electrode 30 may be formed so as to extend across from the second side face 5 to the third side face 6 adjacent to the second side face 5. The second terminal electrode 32 may be formed so as to extend across from the second side face 5 to the fourth side face 7 adjacent to the second side face 5.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a capacitor element body having a plurality of insulator layers laminated, and a plurality of first internal electrodes and second internal electrodes arranged as opposed with at least one of the insulator layers in between;
   first and second terminal electrodes disposed on one external surface extending in a direction parallel to a laminating direction of the insulator layers, among external surfaces of the capacitor element body; and
   only one connection conductor disposed on an external surface extending in the direction parallel to the laminating direction of the insulator layers, among the external surfaces of the capacitor element body;
   wherein the plurality of first internal electrodes includes two types of internal electrodes, a first type of internal electrode connected directly to the first terminal electrode and the connection conductor, and a second type of internal electrode connected directly to the connection conductor only; and
   wherein all the plurality of second internal electrodes are connected directly to the second terminal electrode only.

2. The multilayer capacitor according to claim 1, wherein the external surface on which the first and second terminal electrodes are disposed is different from the external surface on which the connection conductor is disposed.

3. The multilayer capacitor according to claim 2, wherein the external surface on which the first and second terminal electrodes are disposed faces the external surface on which the connection conductor is disposed.

4. The multilayer capacitor according to claim 1, wherein the external surface on which the first and second terminal electrodes are disposed constitutes a mounted surface to be opposed to another component.

5. A multilayer capacitor comprising:
   a capacitor element body having a plurality of insulator layers laminated, and a plurality of first internal electrodes and second internal electrodes arranged as opposed with at least one of the insulator layers in between;

first and second terminal electrodes disposed on one external surface extending in a direction parallel to a laminating direction of the insulator layers, among external surfaces of the capacitor element body; and only one connection conductor disposed on an external surface extending in the direction parallel to the laminating direction of the insulator layers, among the external surfaces of the capacitor element body;

wherein all the plurality of first internal electrodes are connected directly to the connection conductor;

wherein all the plurality of second internal electrodes are connected directly to the second terminal electrode only; and wherein the first internal electrodes as many as at least one and at most a number smaller by one than a total number of the first internal electrodes, among the plurality of first internal electrodes, are connected directly to the first terminal electrode.

6. The multilayer capacitor according to claim 5, wherein the external surface on which the first and second terminal electrodes are disposed is different from the external surface on which the connection conductor is disposed.

7. The multilayer capacitor according to claim 6, wherein the external surface on which the first and second terminal electrodes are disposed faces the external surface on which the connection conductor is disposed.

8. The multilayer capacitor according to claim 5, wherein the external surface on which the first and second terminal electrodes are disposed constitutes a mounted surface to be opposed to another component.

* * * * *